United States Patent [19]

Boer et al.

[11] Patent Number: 4,817,114
[45] Date of Patent: Mar. 28, 1989

[54] MULTIPOINT DATA MODEM COMMUNICATION SYSTEM

[75] Inventors: Jan Boer, AN Utrecht; Wilhelmus J. M. Diepstraten, VL Diessen, both of Netherlands

[73] Assignee: NCR Corporation, Dayton, Ohio

[21] Appl. No.: 163,357

[22] Filed: Mar. 2, 1988

[30] Foreign Application Priority Data

Nov. 16, 1987 [GB] United Kingdom ............... 8726813

[51] Int. Cl.⁴ .............................................. H04B 1/38
[52] U.S. Cl. ............................................ 375/8; 375/14
[58] Field of Search ..................... 375/8, 12, 14, 13; 370/123, 70, 50

[56] References Cited

U.S. PATENT DOCUMENTS 4,416,015  11/1983  Gitlin ..................................... 375/14
4,577,334  3/1986  Boer et al. ............................. 375/97

FOREIGN PATENT DOCUMENTS 0169548  7/1985  European Pat. Off. .
0180066  7/1985  European Pat. Off. .
0204308  6/1986  European Pat. Off. .
2174274  10/1985  United Kingdom .

Primary Examiner—Robert L. Griffin
Assistant Examiner—Marianne Huseman
Attorney, Agent, or Firm—Wilbert Hawk, Jr.; Albert L. Sessler, Jr.; Richard W. Lavin

[57] ABSTRACT

A multipoint data modem communication system includes a control modem (12) and a plurality of tributary modems (14, 16, 18). During an initial training mode, receiver parameters and equalizer coefficients are determined and stored in a storage device (156) in the control modem receiver at addresses associated with the tributary modems. During subsequent relatively short training signals, the stored parameters are accessed. The remote modems transmit identification address tones in parallel with the subsequent training signals, at frequencies separated by 200 Hz intervals from the training signal spectrum frequencies. A plurality of Discrete Fourier Transform (DFT) filter circuits (190) are utilized to determine the transmitted addresses by measuring the correlation of the received signal with locally-generated frequencies.

6 Claims, 6 Drawing Sheets

MULTIPOINT DATA MODEM COMMUNICATION SYSTEM

BACKGROUND OF INVENTION

1. Field of the Invention.

This invention relates to multipoint data modem communication systems, of the kind including a control modem and a plurality of tributary modems, wherein said tributary modems include respective modem transmit means adapted to transmit a training signal and a modem identification signal and said control modem includes tributary modem identification means.

2. Description of the Prior Art.

A data modem communication system of the kind specified is known from European patent application No. 0 169 548. According to the known system, a master modem is connected in a multipoint network with a plurality of remote (tributary) modems. During an initial, relatively long, training sequence, receiver operating parameters and equalizer coefficients are acquired and stored at locations allocated to the respective remote modems. During subsequent, relatively short training sequences, the previously stored coefficients and parameters are acquired from storage and adjusted, if adjustment is required. For these subsequent, short training sequences, the remote modems transmit identification codes. According to a first arrangement, the identification code is formed by a time interval which is transmitted after the training sequence but before the data is transmitted. According to a second arrangement, the identification code is formed by a tone frequency which is transmitted before the training sequence and the data is transmitted. Each remote modem may have a respective tone frequency associated therewith, or there may be a sequence of different tone sets to identify the modem. The known system has the disadvantage that the start-up time for transmissions from the remote modems is lengthened as a result of the transmission of the modem identification signal in sequence with the training signal.

SUMMARY OF THE INVENTION

This invention relates to a multipoint data modem communication system including a control modem and a plurality of tributary modems in which a modem transmit means located in each of the tributary modems is adapted to transmit a signal including a training signal and an identification signal in parallel, wherein said identification signal includes a plurality of simultaneously transmitted address frequencies, and wherein modem identification means located in the control modem includes a plurality of Discrete Fourier Transform filter circuits each adapted to measure the correlation of the received signal with an associated one of the address frequencies and to suppress the remaining address frequencies, and sensing means adapted to determine which of said Discrete Fourier Transform filter circuits are producing an output signal and to thereby provide an address signal representing the identity of the transmitting tributary modem.

It is thus an object of the present invention to provide a multipoint data modem communication system wherein the aforementioned disadvantage is alleviated.

BRIEF DESCRIPTION OF THE DRAWINGS

Additional advantages and meritorious features of the present invention will be apparent from the following detailed description and appended claims when read in conjunction with the drawings, wherein like nu identify corresponding elements.

DESCRIPTION OF THE PREFERRED EMBODIMENT

Figure 1:
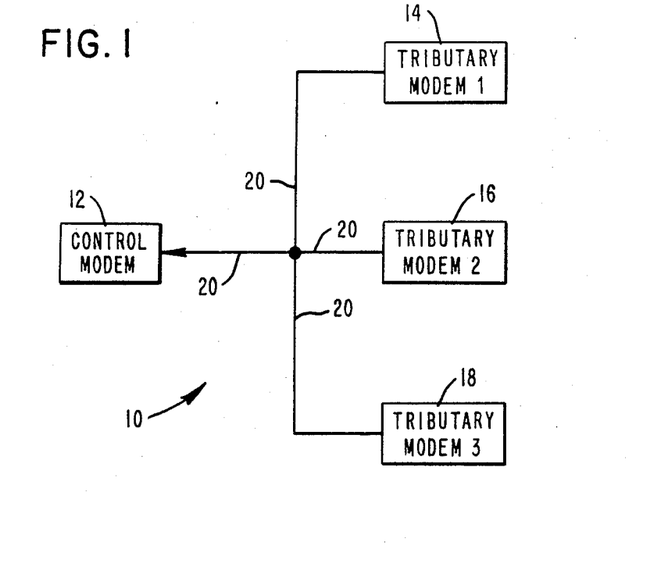
FIG. 1 is a block diagram of a multipoint data modem communication system.

Referring now to FIG. 1, there is illustrated a multipoint modem network 10, wherein a control modem 12 is in communication over a telephone transmission line 20 with three tributary modems 14, 16 and 18. It will be appreciated that in practice, two, three, four or a larger number of tributary modems could be employed. It will also be appreciated that each modem will be connected to associated data terminal equipment. However, such data terminal equipment is not relevant to the present invention and therefore will not be described herein.

Figure 2:
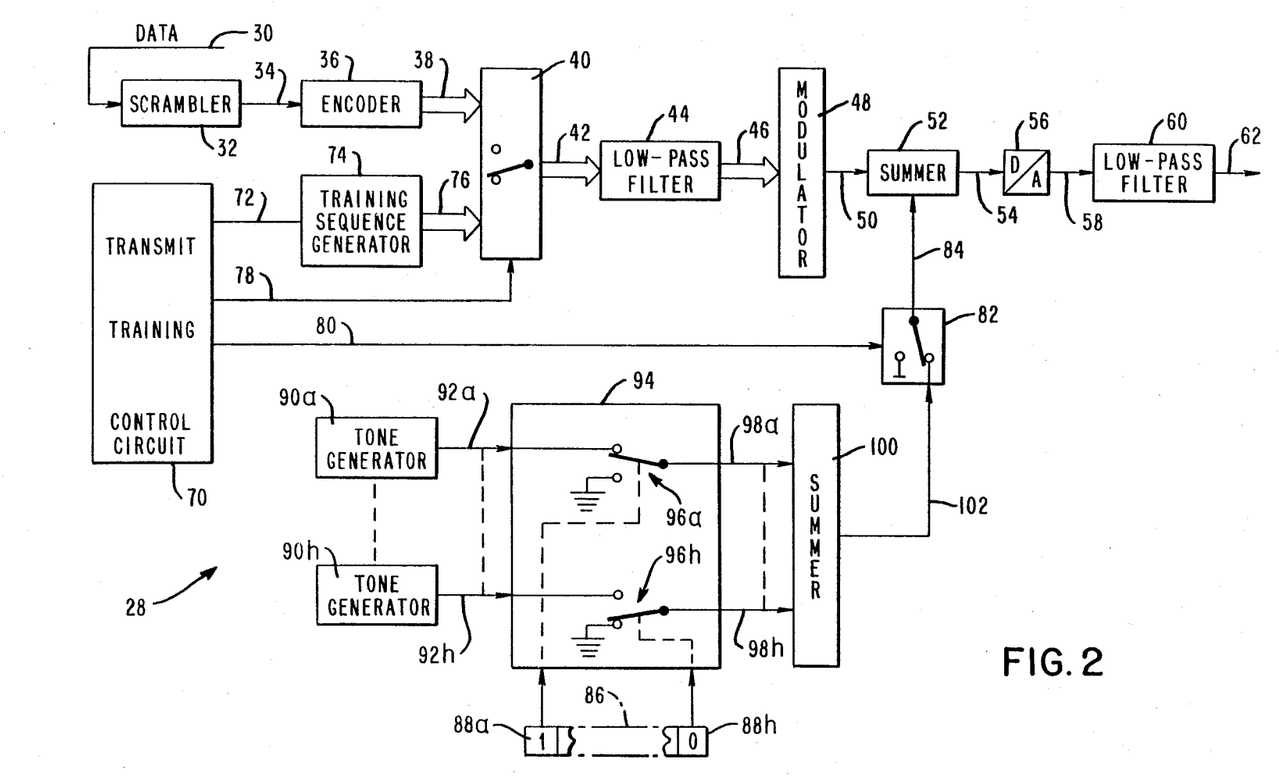
FIG. 2 is a block diagram of a remote modem transmitter.

Each of the modems 12–18 inclusive, includes a transmitter section and a receiver section. Referring to FIG. 2, there is shown a block diagram of the transmitter section 28 of one of the tributary modems 14, 16 or 18. It should be understood that throughout the drawings, a double line interconnection is used for complex-valued quantities and a single line interconnection is used for real-valued quantities. Signals representing data symbols are applied over an input line 30 to a scrambler circuit 32, which is connected over a line 34 to an encoder 36. The complex signal output of the encoder 36 is connected over a line 38 to a switch 40 having an output connected over a line 42 to a low-pass filter 44. The output of the low-pass filter 44 is connected over a line 46 to a modulator 48 which is connected over a line 50 to a summer circuit 52. The output of the summer circuit 52 is connected over a line 54 to a digital-to-analog converter 56 having an output connected over a line 58 to a low-pass filter 60, the output 62 of which is connected to the telephone transmission line 20 (FIG. 1). The scrambler circuit 32, encoder 36, low-pass filter 44, modulator 48, digital-to-analog converter 56 and low-pass filter 60 are conventional circuits used in modem communication systems and will not be described in detail here. Briefly, the low-pass filter 44 is used for signal shaping and interpolation from the 2400 Hz symbol rate to the 9600 Hz sample rate. The power spectral density of the resulting signal is centered around 0 Hz. The modulator 48 shifts this spectrum to around the carrier frequency ($f_c$) of 1700 Hz. The digital-to-analog converter 56 converts the real part of the modular output to an analog signal. The low-pass filter 60 filters out the high frequency to make the signal suitable for the transmission line 20.

The transmitter section 28 is adapted, prior to each data transmission, to transmit a training signal. In this regard, there is provided a transmit training control circuit 70, which is adapted to control, over a control line 72, a training sequence generator 74, which provides a complex signal output over a line 76 to the switch 40. The control circuit 70 also controls, over a control line 78, the operation of the switch 40, and, over a control line 80, the operation of a switch 82 which has an output connected over a line 84 to the summer circuit 52. The modem having the transmitter section 28 is identified by a modem address which is in the form of an 8-bit binary number stored in an address register 86 having eight states 88a–88h inclusive. Also provided are eight tone generators 90a–90h inclusive connected over respective lines 92a–92h inclusive to a switching device 94 including eight individual switches 96a–96h inclusive. The eight switches 96a–96h inclusive are controlled by the contents of the eight stages 88a–88h inclusive of he address register 86. The respective outputs of the switches 96a–96h inclusive are connected over respective lines 98a–98h inclusive to a summer circuit 100, which is connected over a line 102 to an input of the switch 82.

The operation of the transmitter section 28 will now be briefly described. It should be understood that the transmit training control circuit 70 is effective during the transmission of a training sequence, to operate the training sequence generator 74 over the line 72, the switch 40 over the line 78 and the switch 82 over the line 80, such that a training signal and a modem identification address signal are provided simultaneously to the summer circuit 52 and transmitted in parallel over the transmission line 20.

Figure 3:
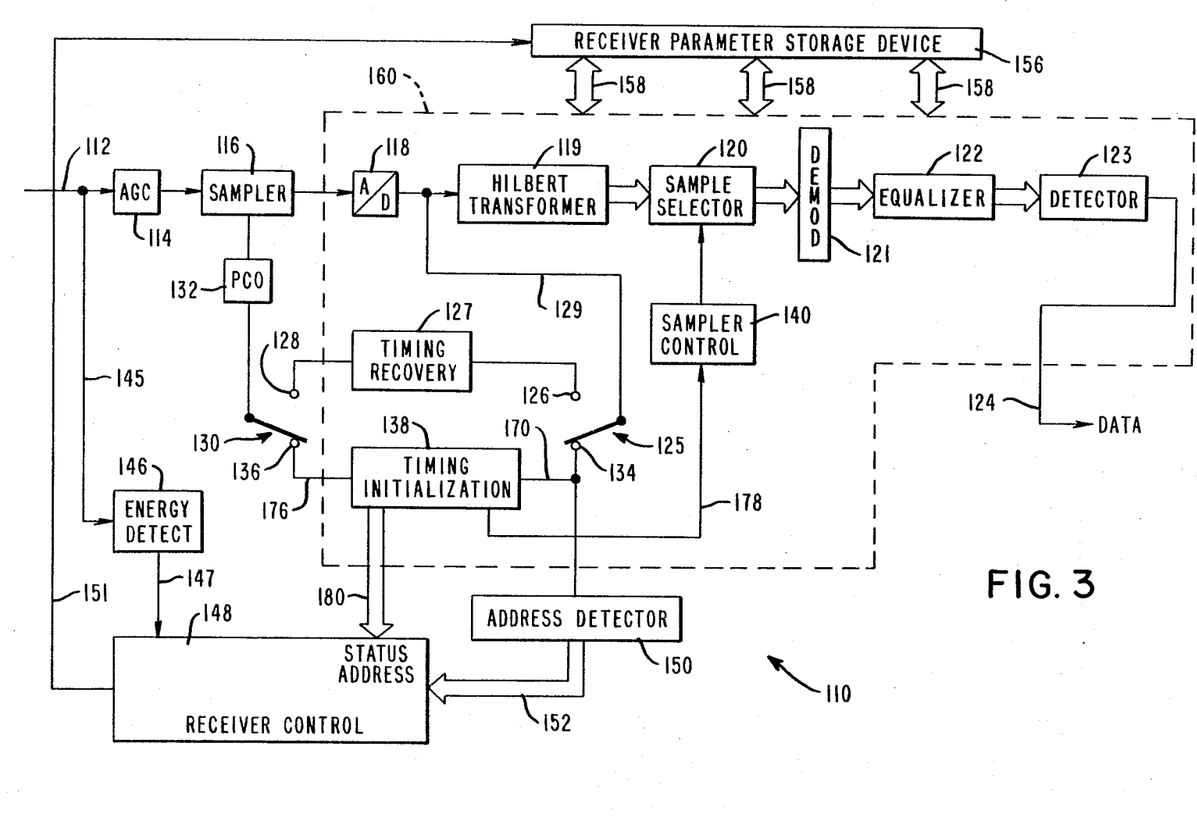
FIG. 3 a block diagram of the control modem receiver.

Referring now to FIG. 3, there is shown a block diagram of the receiver portion 110 of the control modem 12 (FIG. 1). An input signal from the telephone transmission line 20 (FIG. 1) is applied over an input line 112 to receiver circuitry including an automatic gain control circuit 114, a sampler circuit 116, an analog-to-digital converter 118, a Hilbert transformer 119, a sample selector circuit 120, a demodulator 121, an equalizer 122 and a detector 123, which provides a DATA output signal on a line 124. The output of the analog-to-digital converter 118 is also connected over line 129 to a switch 125 having a first terminal 126 connected to a timing recovery circuit 127 which has an output connected to a first terminal 128 of a switch 130 which is connected to an input of a phase controlled oscillator (PCO) 132 having an output connected to the sampler circuit 116. Connected between a second terminal 134 of the switch 125 and a second terminal of the switch 130 is a timing initialization circuit 138. An output line 178 of the timing initialization circuit 138 is connected to a sampler control circuit 140 which has an output connected to the sample selector circuit 120. An energy detect circuit 146 is connected over line 145 to the input line 112 and has an output line 147 connected to a receiver control circuit 148. The switches 125, 130 are in their lower positions shown in FIG. 3 during the reception of a training signal, and are moved to their upper positions during the reception of a data signal. For a more detailed description of the modem receiver circuitry described thus far, reference should be made to U.S. Pat. No. 4,577,334.

The terminal 134 of the switch 125 is also connected to an address detector 150, which will be described in detail hereinafter. The output of the address detector 150 is connected over a bus 152 to the receiver control circuit 148. The receiver control circuit is connected over line 151 to a receiver parameter storage device 156.

During an initial training operation, an initial training sequence is transmitted from one of the tributary modems 14, 16, 18 to the control modem 12 (FIG. 1). The initial training sequence consists of a plurality of segments, each containing a predetermined number of symbol intervals. For example, following a predetermined idle time, the training sequence may contain a first segment consisting of 128 symbol intervals containing alternations between two signal elements, a second segment consisting of 384 symbol intervals containing an equalizer conditioning pattern and a third segment containing 48 symbol intervals consisting of a scrambled all binary ones signal. Such a training signal conforms with the CCITT Recommendation V. 29. Utilizing this training signal, the receiver control circuit 148 (FIG. 3) develops all relevant receiver parameters, such as equalizer taps, phase jitter, frequency shift and timing offset. For each tributary modem 14, 16, 18, these parameters are stored in the receiver parameter storage device 156 (FIG. 3), which may be a remote modem. The receiver parameters are transferred to the storage device 156 over input/output lines 158 which are coupled to relevant receiver components located within the receiver portion 160.

During subsequent transmission from one of the tributary modems 14, 16, 18, the transmitting modem transmits its address and a subsequent training signal which is substantially shorter than the training signal transmitted during the initial training described above. In response to the receipt of the address of the transmitting modem, the relevant receiver parameters are read out from the storage device 156 and transmitted over the input/output lines 158 to the relevant receiver components. Thus, once the proper receiver timing has been set, no additional training of the control modem receiver is necessary.

Figure 4:
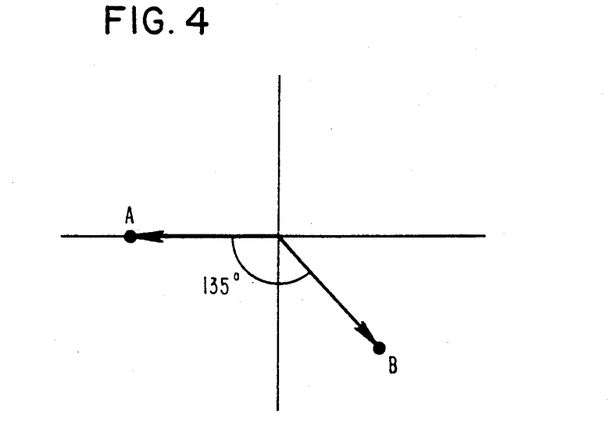
FIG. 4 a phase diagram illustrating a training signal
Figure 5:
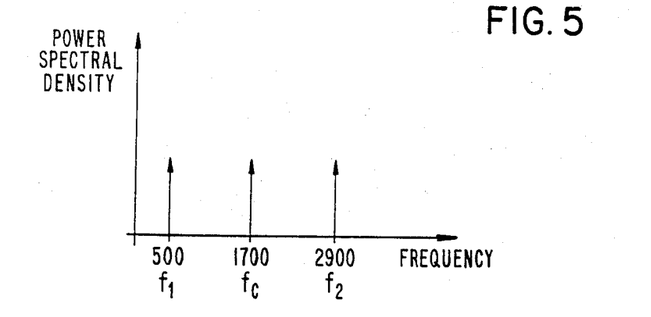
FIG. 5 a power spectral density plot for the training

The preferred embodiment of the invention is a modem network which transmits data at 9600 bps (bits per second) using a modulation rate of 2400 Hz on a 1700 Hz carrier. The sample frequency utilized is 9600 Hz. For such a modem network, a subsequent training signal is used which has eighteen alternations between two signal elements. Referring to FIG. 4, there is shown the signal space diagram for alternations between points A and B, corresponding to phase jumps of 135°. The resulting power spectral density, when a 1700 Hz carrier frequency is employed, is shown in FIG. 5, which indicates strong spectral components appearing at $f_1=500$ Hz, $f_c=1700$ Hz (the carrier frequency) and $f_2=2900$ Hz. It should be noted that $f_1$ and $f_2$ are calculated as follows:

$$f_1 = f_c - \tfrac{1}{2}f_b$$

$$f_2 = f_c + \tfrac{1}{2}f_b,$$

where $f_b$ is the modulation rate having a value at 2400 Hz.

Figure 6:
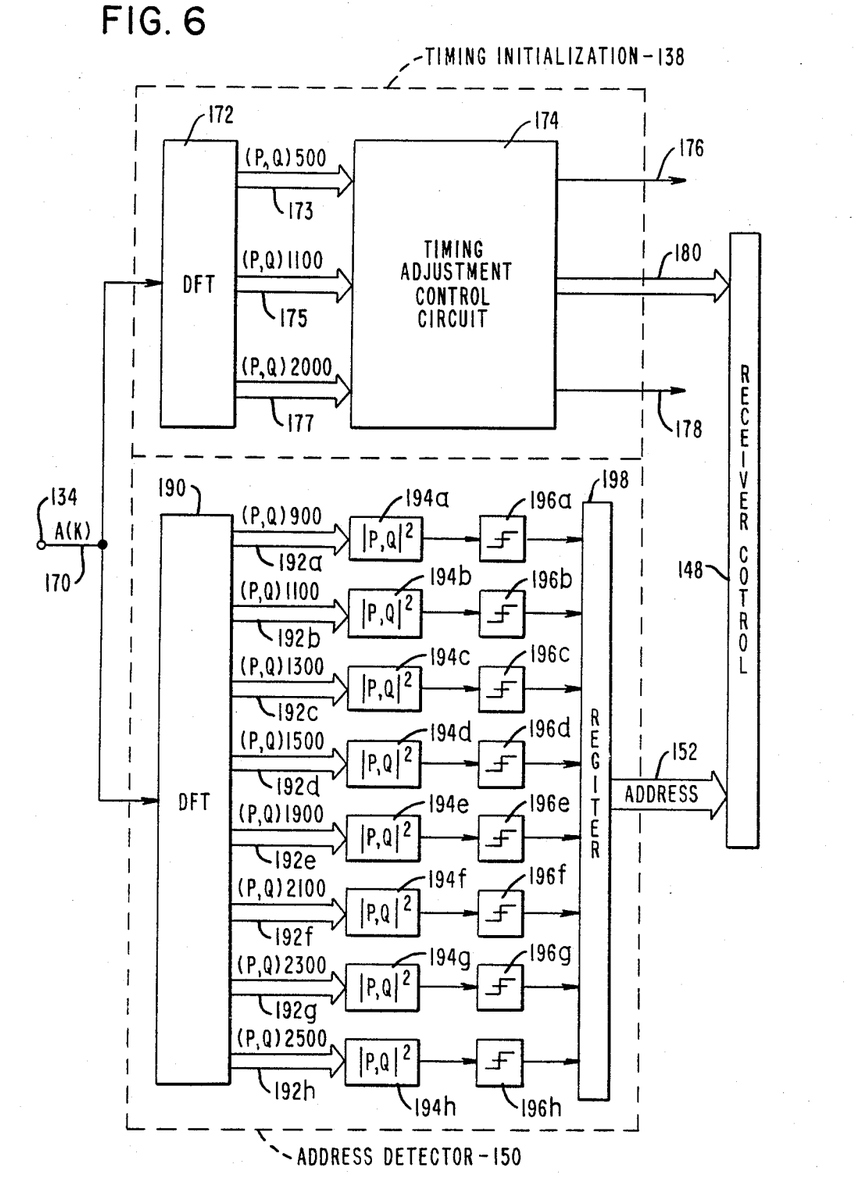
FIG. 6 is a more detailed block diagram of a part of the con modem receiver.

Referring now to FIG. 6, there is shown a more detailed circuit diagram for the timing initialization circuit 138 and the address detector circuit 150 (FIG. 3). The terminal 134 of the switch 5 (FIG. 3) is connected over a line 170 to a DFT (Discrete Fourier Transform) module 172 which consists of three DFT filter circuits (not shown) for frequencies of 500 Hz, 1700 Hz and 2900 Hz. The DFT filter circuits measure the correlation of the received signal with respective locally generated frequencies. The DFT module 172 is connected over lines 173, 175 and 177 to a timing adjustment control circuit 174 which produces timing signals on lines 176 and 178 connected to the switch terminal 136 (FIG. 3) and the sampler control circuit 140, and status signals on the bus 180 (FIGS. 3 and 6) connected to the receiver control circuit 148. Since these timing and status signals are not pertinent to the present invention, the timing adjustment control circuit 174 will not be described in detail herein.

The line 170 is also connected to a DFT module 190 which contains eight DFT filter circuits (not shown in FIG. 6) having outputs connected over lines 192a-192h inclusive to eight squared length determination circuits 194a-194h inclusive. These DFT filter circuits measure the correlation of the received signal with respective generated frequencies. The squared length determination circuits 194a-194h inclusive are connected to respective threshold comparison circuits 196a-196h inclusive, the outputs of which are signals representing a binary "1" or a binary "0" according to whether a predetermined threshold value is or is not exceeded. The outputs of the comparison circuits 196a-196h are connected to the respective stages of an 8-bit binary register 198 which applies the address stored therein to the address bus 152.

Figure 7:
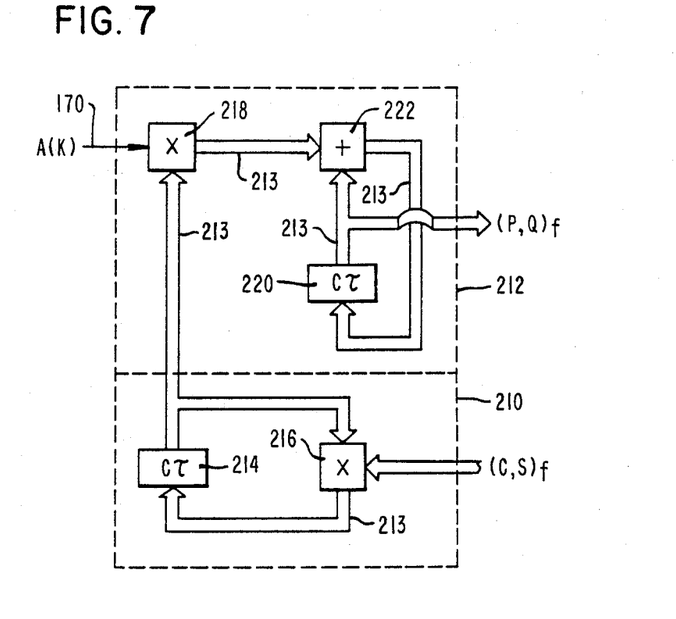
FIG. 7 a schematic diagram of a Discrete Fourier Transform filter circuit.

Referring now briefly to FIG. 7, there is shown the implementation of a typical DFT circuit such as is utilized in the DFT modules 172 and 190 (FIG. 6). It should be understood that such DFT filter is effective to measure the correlation between an input signal and a locally generated frequency, according to the equation:

$$(P, Q)_f = \sum_{k=0}^{n-1} A(k) [\cos(2\pi f/f_s), \sin(2\pi f/f_s)] \quad (1)$$

where:
(P, Q)f = real and imaginary parts of DFT components of frequency f
A(k) = input sample k
f = locally-generated frequency
$f_s$ = sample frequency
n = number of samples The DFT filter output is a vector of which the length is a measure of the strength of the appropriate frequency component in the input signal and of which the angle represents the phase difference between the locally-generated frequency and the appropriate frequency component in the input signal.

Figure 8:
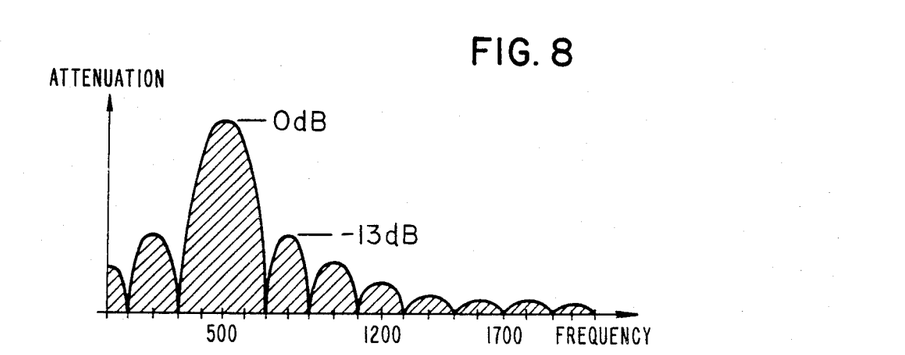
FIG. 8 is a plot illustrating the frequency response (attenuation) of a typical Discrete Fourier Transform circuit used in the control modem receiver shown in FIG. 6.

Referring now to FIG. 8, there is shown the frequency response (attenuation) of a DFT filter for f=500 Hz, $f_s$=9600 Hz and n=48. For these values, the resolution of the filter is 200 Hz. As can be clearly seen from FIG. 8, the frequency components at 200 Hz intervals from frequency f are completely suppressed. The frequency responses for the other DFT filter circuits, that is, for frequencies 1700 Hz and 2900 Hz in the DFT module 172, (FIG. 6) and for frequencies 900 Hz, 1100 Hz, 1300 Hz, 1500 Hz, 1900 Hz, 2100 Hz, 2300 Hz and 2500 Hz in the DFT module 190 (FIG. 6), have similar characteristics, and completely suppress frequencies at 200 Hz intervals from the frequency to which the filter responds.

Figure 9:
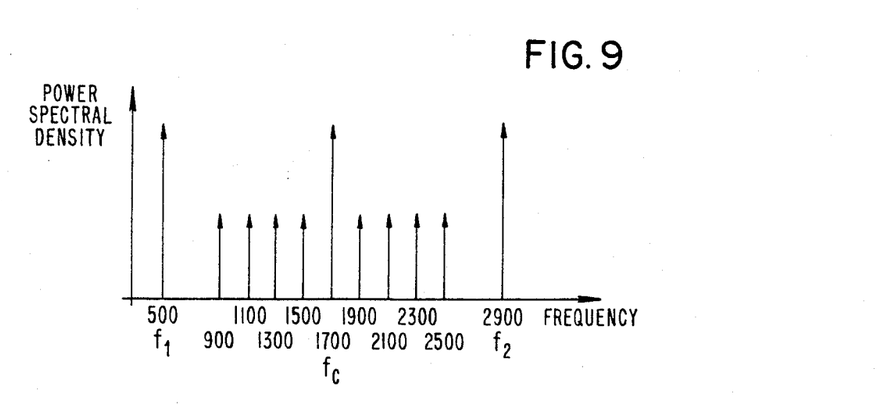
FIG. 9 is a plot showing the power spectral density of a training signal and modem identification signal.

Referring now to FIG. 9, there is shown the power spectral density of the timing training sequence when the address tones transmitted by the tone generators 90a-90h (FIG. 2) are all on, corresponding to an all-ones bit binary address value 11111111. It will be appreciated that the use of DFT filter circuits, in which frequency components at 200 Hz intervals from the frequency to which the circuit is tuned are completely suppressed, guarantees that the transmission of a given address tone does not affect the accuracy of the power measurement corresponding to the address tones by the DFT module 190. Furthermore, since none of the address tones corresponds to the frequencies which occur in the power spectral density of the training signal alternations (FIG. 5), the transmission of the address tones does not affect the response of the DFT circuits in the DFT module 172 (FIG. 6). Also, the frequencies which occur in the power spectral density of the training signal alternations do not affect the response of the DFT circuits in the DFT module 190.

Returning to FIG. 7, the DFT filter circuit consists of a lower portion 210 forming a local oscillator for generating sine and cosine terms and an upper portion 212 forming a correlator. In FIG. 7, the double lines 213 represent complex-valued signal paths. The local oscillator 210 consists of a delay element 214 and a multiplier 216. The delay element 214 delays a complex value with a delay of $1/f_s$. A complex input value $$(c, s)_f = [\cos 2\pi v/f_s, \sin 2\pi f/f_s]$$

is applied to the multiplier 216. In the correlator 212, each digitized input sample A(k) on the input line 170 is multiplied in a multiplier 218 with the instantaneous value in the delay element 214. A delay element 220 stores the output of the DFT filter circuit. The contents of the delay element 220 are added in an adder 222 to the output of the multiplier 218 to produce a new instantaneous value of $(P, Q)_f$. This result is again stored in the delay element 220. In the preferred embodiment, 48 input samples are evaluated (n=48 in equation (1)). A full description of the DFT filter circuit shown in FIG. 7 is contained in the aforementioned U.S. Pat. No. 4,577,334.

Figure 10:
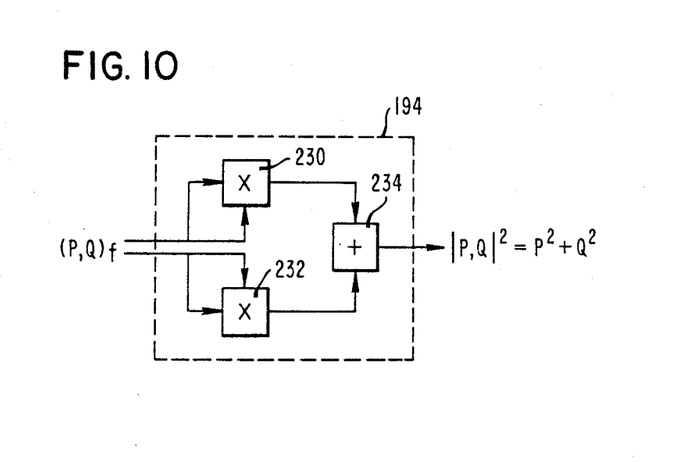
FIG. 10 is a schematic diagram of a squared length determination circuit used in the control modem receiver shown in FIG. 6.

Referring now to FIG. 10, there is shown an embodiment for one of the squared length determination circuits 194a-194h shown in FIG. 6. The squared length determination circuit 194 is effective to square the real and imaginary parts P, Q of the input signal in multipliers 230, 232 respectively and to add the outputs thereof in an adder 234.

As best shown in FIG. 2, the tone generators 90a-90h shown therein are each formed by a delay element and multiplier connected as shown for the local oscillator portion 210 contained in the DFT filter circuit shown in FIG. 7. Only the real part of the complex output signal is used to form the desired output tone.

Various modifications of the invention are possible. For instance the address frequencies are not restricted to the eight values utilized in the preferred embodiment, but a greater or lesser number of frequencies may be utilized, provided that the 200 Hz separation is maintained and the frequencies occurring in the power spectral density of the training signal (FIG. 5) are avoided. It should also be understood that the resolution of the DFT filter in the DFT module can be changed by using different values for n in equation (1). Thus, in the described embodiment, with n=48, a 200 Hz spectral resolution is achieved, whereas with n=96, a 100 Hz spectral resolution would result.

Furthermore, the operation of the DFT filter in the DFT module 190 can be improved in environments with a high noise level by the use of known windowing techniques (such as triangular, Hanning, Hamming, or Blackman windows). For instance, a Hamming window can be applied, with n=96 in equation (1), while maintaining a 200 Hz spectral resolution.

Finally, it should be appreciated that although the invention has been described in relation to a 9600 bps modem utilizing a carrier frequency of 1700 hz, corresponding to the CCITT V.29 Recommendation, the invention is also applicable to other modems implementations. For example a 14400 bps modem operating with a carrier frequency of 1800 Hz could be employed (V.33 Recommendation).

Numerous other modifications and adaptations of the system of the present invention will be apparent to those skilled in the art, and thus it is intended by the appended claims to cover all such modifications and adaptations which fall within the true spirit and scope of this invention.

We claim:

1. A multipoint data modem communication system comprising:
    a control modem and a plurality of tributary modems;
    transmitting means mounted in said tributary modems and adapted to transmit signals including a training signal and a modem identification signal in parallel to said control modem, means mounted in said control modem for identifying a transmitting tributary modem, said modem identification signal including a plurality of simultaneously transmitted address frequencies,
    said transmitting tributary modem identifying means including a plurality of Discrete Fourier Transform filter circuits each adapted to measure the correlation of the received modem identification signal with an associated one of the address frequencies and to suppress the remaining address frequencies; and
    sensing means adapted to determine which of said Discrete Fourier Transform filter circuits are producing an output signal thereby providing an address signal representing the identity of the transmitting tributary modem.

2. A multipoint data modem communication system according to claim 1, wherein said training signal includes a plurality of alternating phase jumps such that said training signal has a power spectral density concentrated at a plurality of training signal frequencies, and wherein said control modem includes timing initialization means including a plurality of Discrete Fourier Transform filter circuits each adapted to measure the correlation of the received signal with an associated one of said training signal frequencies, and to suppress the remaining training signal frequencies and said address frequencies.

3. A multipoint data modem communication system according to claim 2, wherein each of said Discrete Fourier Transform filter circuits includes a first portion adapted to generate a complex value signal representing an associated locally-generated frequency and a second portion responsive to the receive signal and to said complex value signal and adapted to generate an output signal representative of the correlation between said received signal and said associated locally-generated frequency.

4. A multipoint data modem communication system according to claim 1, wherein said transmitting means includes training signal generation means, tone generation means adapted to generate a plurality of said address frequencies representing the associated modem, and summing means adapted to combine the outputs of said training signal generation means and said tone generation means.

5. A multipoint data modem communication system according to claim 4, wherein said tone generation means includes;
    a plurality of tone generators each adapted to generate an associated one of said address frequencies;
    switching means, including a plurality of individual switches coupled respectively to said tone generators;
    an address register adapted to store a binary address identifying the associated modem and adapted to control the operation of said switching means; and
    combining means coupled to said switching means and adapted to combine the output signals of said individual switching devices.

6. A multipoint data modem communication system according to claim 1, in which said Discrete Fourier Transform filter circuits operate in accordance with the equation:

$$(P, Q)_f = \sum_{k=0}^{n-1} A(k) [\cos (2\pi f/f_s), \sin (2\pi f/f_s)]$$

where:
    $(P, Q)_f$ = real and imaginary parts of DFT components of frequency f
    $A(k)$ = input sample k
    f = locally-generated frequency
    $f_s$ = sample frequency
    n = number of samples.

* * * * *